UNITED STATES PATENT OFFICE.

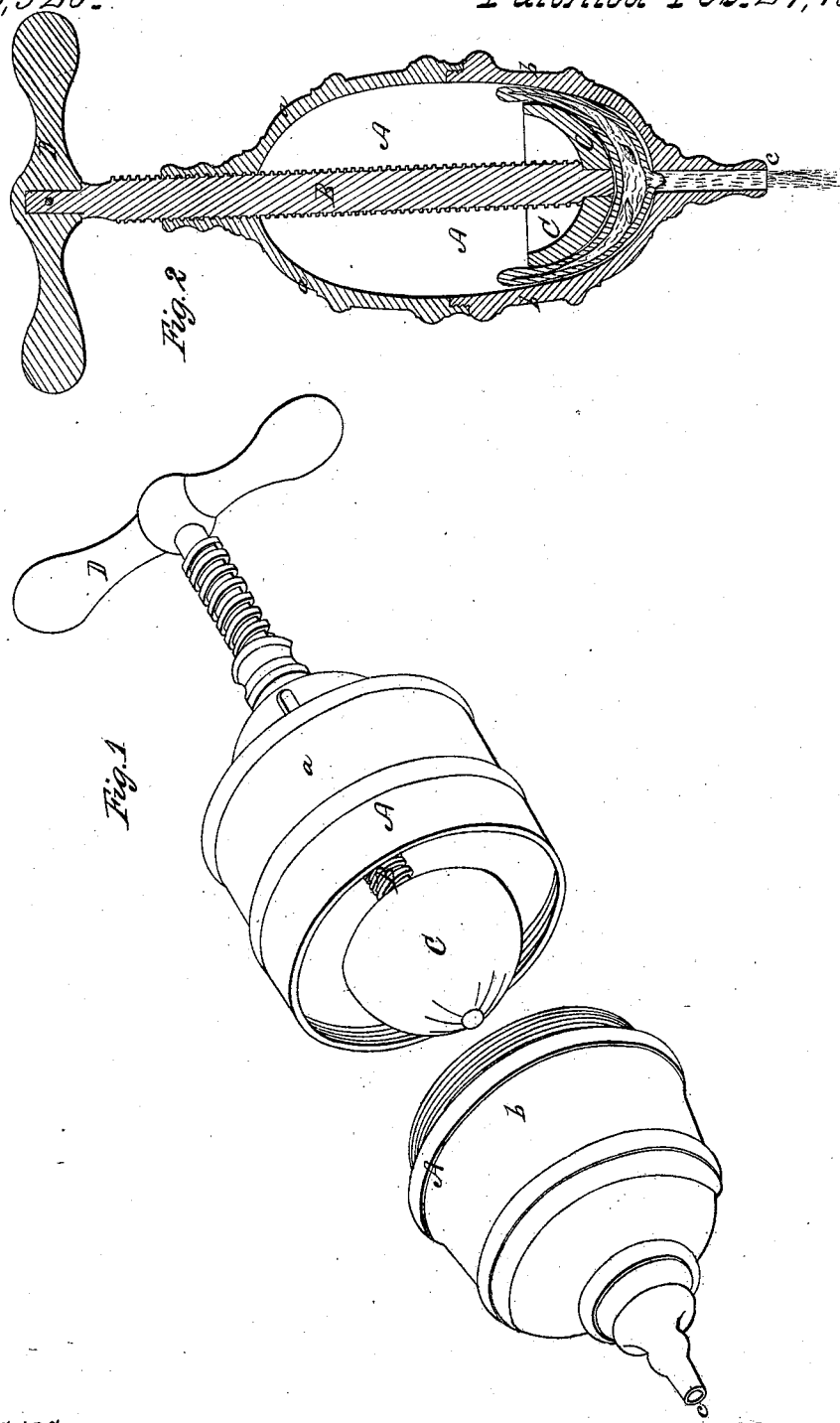

VALENTINE FOGERTY, OF BOSTON, ASSIGNOR TO CORNS. CALLAGHAN, OF BOSTON, AND JAMES BIRMINGHAM, OF ROXBURY, MASSACHUSETTS.

LEMON-SQUEEZER.

Specification forming part of Letters Patent No. 52,928, dated February 27, 1866.

*To all whom it may concern:*

Be it known that I, VALENTINE FOGERTY, of Boston, in the county of Suffolk and State of Massachusetts, have invented an Improved Lemon-Squeezer, of which the following is a full, clear, and exact description, reference being had to the accompanying drawings, making part of this specification, in which—

Figure 1 is a perspective view of my improved lemon-squeezer, the two portions being detached. Fig. 2 is a central longitudinal section through my improved lemon-squeezer, the two portions being coupled together, and the lemon being shown in the position which it occupies after being squeezed.

My invention has for its object to produce a simple and convenient lemon-squeezer; and it consists in a hollow shell or casing, within which the lemon is placed, a plunger being forced down onto the lemon by means of a screw so as to extract the juice, which is forced out through a nozzle or orifice at the bottom of the casing.

To enable others skilled in the art to understand and use my invention, I will proceed to describe the manner in which I have carried it out.

In the said drawings, A represents the outer shell or casing, of iron or other suitable material, which is made in two portions, $a\,b$, coupled together when in use by means of a screw, as seen in Fig. 2. B is a screw which passes through the upper portion of the casing A, and carries at its lower end a plunger, C, which turns loosely thereon, and is of the form seen in Fig. 1, its diameter being considerably less than that of the interior of the casing A. The screw B is operated by means of a handle, D, secured to its upper end. The lower portion, $b$, of the casing A is provided with a nozzle or orifice, $c$.

The operation is as follows: The two portions $a\,b$ of the casing being unscrewed, as seen in Fig. 1, and the plunger carried up into the portion $a$ by means of the screw B, the lemon is placed within the portion $b$, its lower end having been previously cut off or perforated to facilitate the escape of the juice. The two portions $a\,b$ are then screwed together and grasped in one hand, while the handle D is turned with the other, thus forcing the plunger C down onto the lemon and extracting the juice, which is forced out through the nozzle $c$ into a receptacle placed to receive it. When the plunger C is forced down the lemon assumes the shape seen in Fig. 2, the upper half being forced into the lower half, thus extracting every particle of juice and avoiding all waste.

It will be seen that after a lemon is placed within the squeezer, when a small quantity of juice is required, it is simply necessary to turn the handle D a few times; and this may be repeated until the juice is entirely extracted, when the lemon may be replaced by another.

The above-described lemon-squeezer is simple and convenient, and may be furnished at a moderate cost.

What I claim as my invention, and desire to secure by Letters Patent, is—

The within-described lemon-squeezer, consisting of the casing A, with its plunger C, operated by the screw B, substantially as set forth.

VALENTINE FOGERTY.

Witnesses:
    P. E. TESCHEMACHER,
    N. W. STEARNS.